(12) United States Patent
Fifield (10) Patent No.: US 7,356,309 B2
(45) Date of Patent: Apr. 8, 2008

(54) DIRECTIONAL COUPLER FOR COMMUNICATION SYSTEM

(75) Inventor: David Fifield, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 755 days.

(21) Appl. No.: 10/810,198

(22) Filed: Mar. 26, 2004

(65) Prior Publication Data

US 2005/0215198 A1   Sep. 29, 2005

(51) Int. Cl.
  *H04B 1/00*   (2006.01)
(52) U.S. Cl. .................. 455/63.1; 455/39; 455/114.1; 455/114.2; 455/278.1; 455/296; 324/95
(58) Field of Classification Search ............... 455/63.1, 455/39, 114.1, 114.2, 278.1, 296; 324/95
See application file for complete search history.

(56) References Cited

U.S. PATENT DOCUMENTS

| | | | | |
|---|---|---|---|---|
| 4,811,422 A | * | 3/1989 | Kahn ..................... | 455/114.1 |
| 5,212,815 A | * | 5/1993 | Schumacher ............. | 455/126 |
| 5,532,646 A | * | 7/1996 | Aihara ................... | 330/279 |
| 6,046,631 A | * | 4/2000 | Kitahara et al. ......... | 329/354 |
| 6,108,351 A | * | 8/2000 | Hardy et al. ............ | 370/491 |
| 6,163,222 A | * | 12/2000 | Kobayashi .............. | 330/302 |
| 6,271,723 B1 | * | 8/2001 | Nagano et al. ......... | 330/149 |
| 6,466,084 B1 | * | 10/2002 | Ciemniak .............. | 327/553 |
| 6,466,463 B1 | * | 10/2002 | Morita ................. | 363/21.16 |
| 6,873,608 B1 | * | 3/2005 | Plotnik et al. .......... | 370/328 |
| 6,894,476 B2 | * | 5/2005 | Wyse et al. ............ | 324/95 |
| 2002/0196069 A1 | * | 12/2002 | Tanaka ................. | 327/362 |

* cited by examiner

*Primary Examiner*—Lana Le
*Assistant Examiner*—Amar Daglawi
(74) *Attorney, Agent, or Firm*—Garlick Harrison & Markison, LLP; Bruce E. Garlick (57) ABSTRACT

An improved directional coupler that significantly reduces the signal degradation problems associated with distortion caused by circuit elements used to measure the transmitted power. In a selected embodiment, the directional coupler of the present invention comprises a plurality of active elements, such as capacitors, that have values selected to ensure that the distortion created by circuit elements used to measure forward transmitted power. In an embodiment of the invention, capacitors have values selected to minimize in-band distortion signals at the fundamental carrier frequency of the transmitted signal and also at the second and third harmonics of the fundamental carrier frequency.

9 Claims, 7 Drawing Sheets

DIRECTIONAL COUPLER FOR COMMUNICATION SYSTEM

BACKGROUND OF THE INVENTION

1. Field of the Invention

The present invention is directed in general to wireless communication systems. In one aspect, the present invention relates to a method and system for directional coupling of a communications signal with minimum distortion.

2. Related Art

Communication systems are known to support wireless and wire-lined communications between wireless and/or wire-lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth (BT), advanced mobile phone services (AMPS), digital AMPS, global system for mobile communications (GSM), code division multiple access (CDMA), local multi-point distribution systems (LMDS), multi-channel-multi-point distribution systems (MMDS) and/or variations thereof.

Depending on the type of wireless communication system, a wireless communication device (such as a cellular telephone, two-way radio, personal digital assistant (PDA), personal computer (PC), laptop computer, home entertainment equipment, etc.) communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over the tuned channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switched telephone network, via the Internet, and/or via some other wide area network.

Wireless communication devices typically communicate with one another using a radio transceiver (i.e., receiver and transmitter) that may be incorporated in, or coupled to, the wireless communication device. The transmitter typically includes a data modulation stage, one or more intermediate frequency stages and a power amplifier. The data modulation stage converts raw data into baseband signals in accordance with a particular wireless communication standard. The intermediate frequency stages mix the baseband signals with one or more local oscillations to produce RF signals. The power amplifier amplifies the RF signals prior to transmission via an antenna. In direct conversion transmitters/receivers, conversion directly between baseband signals and RF signals is performed. The receiver is typically coupled to an antenna and includes a low noise amplifier, one or more intermediate frequency stages, a filtering stage and a data recovery stage. The low noise amplifier receives inbound RF signals via the antenna and amplifies them. The intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As the use of wireless communication devices increases, many wireless communication devices will include two or more radio transceivers with two or more antennas, where each radio transceiver is compliant with any of a variety of wireless communication standards and may be used with the exemplary communication systems described herein, including Bluetooth, IEEE 802.11 (a), (b), (g) and others. For instance, a computer may include two radio transceivers, one for interfacing with an 802.11a wireless local area network (WLAN) device and another for interfacing with an 802.11g WLAN device. In this example, the 802.11g transceiver operates in the 2.4 GHz frequency range and the 802.11a transceiver operates in the 5 GHz frequency range.

Many of the current transceivers comprise directional couplers to provide a measurement of transmitted power for quality and regulatory purposes. For example, current regulations promulgated by the U.S. Federal Communications Commission (FCC) require precise measurement of RF emissions from wireless communications devices.

A directional coupler is a linear, passive, multi-port network, consisting of a pair of electromagnetically coupled signal conducting "lines" or structures such as strip lines or transmission lines. One of the pair of lines is a "main signal line" that connects an input port of the coupler to an output port. The other of the pair of lines is an "auxiliary signal line" that is connected to at least one measurement or utilization port. The auxiliary line is coupled to the main line through a "coupling region" where the lines are in close proximity to each other. A radio frequency (RF) signal applied to the main line induces a signal in the auxiliary line. This signal can be measured to provide an indication of the forward transmitted power or the reflected transmitted power. An example of a directional coupler is disclosed in U.S. Pat. No. 6,686,812, entitled "Miniature Directional Coupler," issued to Gilbert et al. on Feb. 3, 2004, which is incorporated by reference herein for all purposes.

Directional couplers are generally either 3-port unidirectional couplers and 4-port bi-directional couplers. A unidirectional coupler consists of a main line and an auxiliary line, which can be internally terminated in the coupler at one end with the other end providing the coupled output. A bidirectional coupler is similar to the unidirectional coupler with the exception that both ends of the auxiliary line provide coupled outputs. Thus the bi-directional coupler can be used for simultaneously monitoring both the forward and the reflected power.

Forward transmitter power may be monitored to determine transmitter output power and efficiency. A directional coupler can perform as a measurement tool that samples a small portion of the radio frequency energy traveling through the main line between a signal source and a load, for instance. This energy can travel "forward" from a signal source such as a transmitter to a load such as an antenna and/or the energy can be reflected in "reverse" from the antenna to the transmitter.

One of the problems associated with directional couplers is signal degradation associated with distortion created by the circuit components used to measure the transmitted power. For example, many directional couplers use a diode detector and a smoothing capacitor to measure forward transmitted power. The diode is a non-linear device that can create distortions at frequencies corresponding to harmonics of the fundamental carrier frequency of the transmitted signal. As will be understood by those of skill in the art, combinations of the harmonic frequencies can cause intermodulation interference that can degrade or destroy the transmitted signal. In view of the foregoing it is apparent that there is a need for an improved directional coupler that significantly reduces the signal degradation problems associated with distortion caused by circuit elements used to measure the transmitted power.

SUMMARY OF THE INVENTION

The method and apparatus of the present invention overcomes the shortcomings of the prior art by providing an improved directional coupler that significantly reduces the signal degradation problems associated with distortion caused by circuit elements used to measure the transmitted power. Broadly speaking, the present invention provides an improved directional coupler for use on wireless communications devices. In a selected embodiment, the directional coupler of the present invention comprises a plurality of passive elements, such as capacitors, that have values selected to ensure that the distortion created by circuit elements used to measure forward transmitted power is minimized. In an embodiment of the invention, the capacitors have values selected to remove or minimize in-band distortion signals at the fundamental carrier frequency of the transmitted signal and also at the second and third harmonics of the fundamental carrier frequency.

The objects, advantages and other novel features of the present invention will be apparent from the following detailed description when read in conjunction with the appended claims and attached drawings.

DETAILED DESCRIPTION

A method and apparatus for an improved wireless communication system is described. While various details are set forth in the following description, it will be appreciated that the present invention may be practiced without these specific details. For example, selected aspects are shown in block diagram form, rather than in detail, in order to avoid obscuring the present invention. Some portions of the detailed descriptions provided herein are presented in terms of algorithms or operations on data within a computer memory. Such descriptions and representations are used by those skilled in the field of communication systems to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that throughout the description, discussions using terms such as processing, computing, calculating, determining, displaying or the like, refer to the action and processes of a computer system, or similar electronic computing device, that manipulates and/or transforms data represented as physical, electronic and/or magnetic quantities within the computer system's registers and memories into other data similarly represented as physical quantities within the computer system memories or registers or other such information storage, transmission or display devices.

Figure 1:
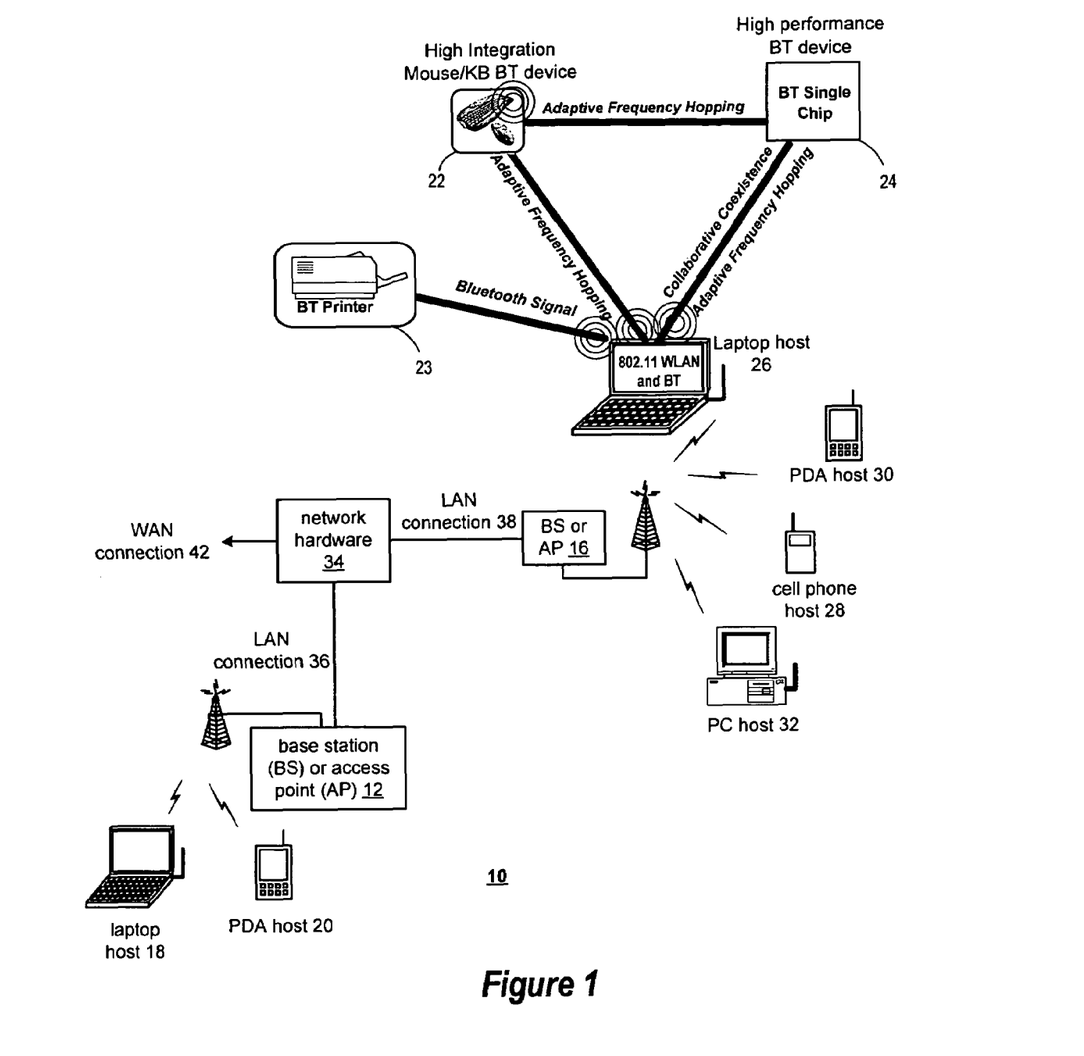
FIG. 1 is a schematic block diagram of a wireless communication system in accordance with the present invention.

FIG. 1 illustrates a wireless communication system 10 in which embodiments of the present invention may operate. As illustrated, the wireless communication system 10 includes a plurality of base stations and/or access points 12, 16, a plurality of wireless communication devices 18-32 and a network hardware component 34. The wireless communication devices 18-32 may be laptop host computers 18 and 26, personal digital assistant hosts 20 and 30, personal computer hosts 32, cellular telephone hosts 28, an 802.11a WLAN device 22 and/or an 802.11g WLAN device 24. The details of the wireless communication devices will be described in greater detail hereinbelow.

As illustrated, the base stations or access points 12, 16 are operably coupled to the network hardware 34 via local area network connections 36, 38. The network hardware 34 (which may be a router, switch, bridge, modem, system controller, etc.) provides a wide area network connection 42 for the communication system 10. Each of the base stations or access points 12, 16 has an associated antenna or antenna array to communicate with the wireless communication devices in its area. Typically, the wireless communication devices register with a particular base station or access point 12, 16 to receive services from the communication system 10. For direct connections (i.e., point-to-point communications), wireless communication devices communicate directly via an allocated channel. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

Figure 2:
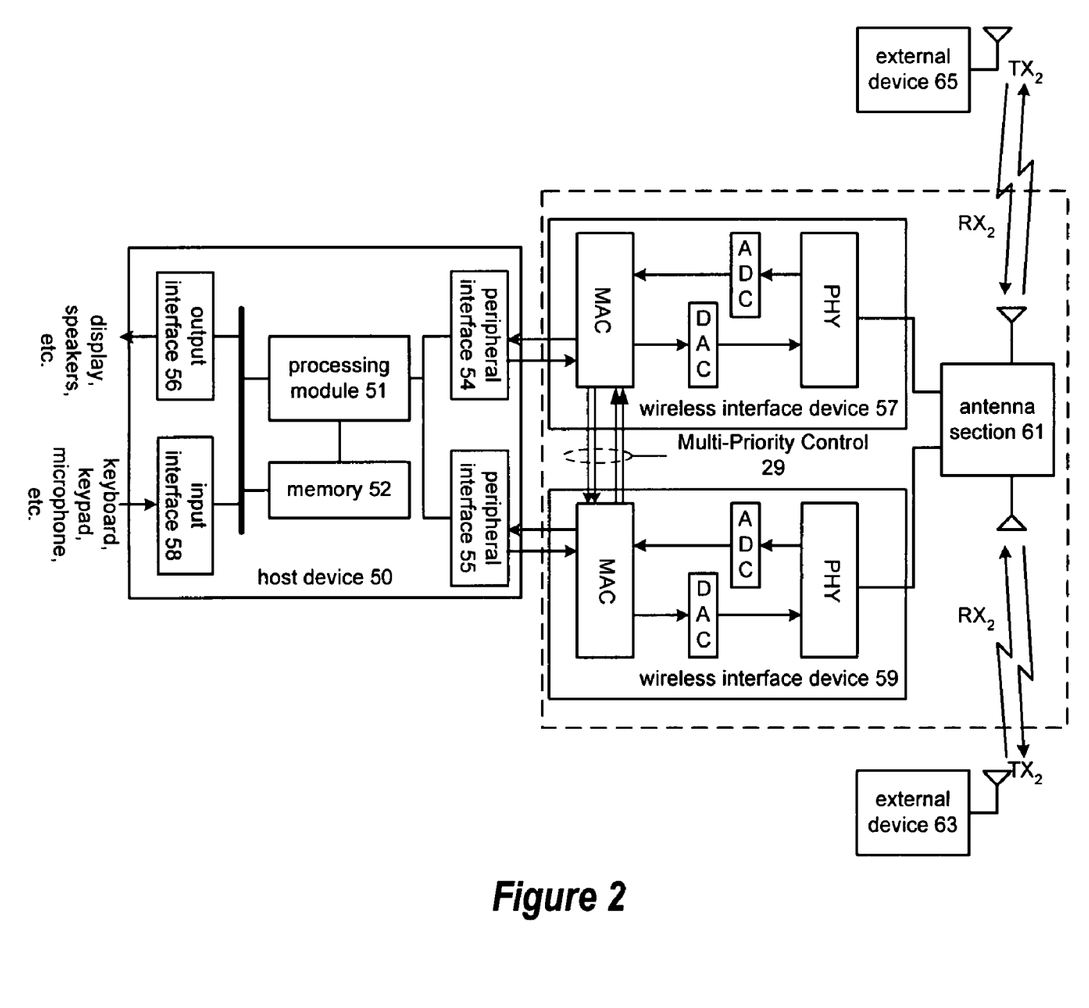
FIG. 2 is a schematic block diagram of a wireless communication device in accordance with the present invention.

FIG. 2 is a schematic block diagram illustrating a radio implemented in a wireless communication device that includes the host device or module 50 and at least one wireless interface device, or radio transceiver 59. The wireless interface device may be built in components of the host device 50 or externally coupled components. As illustrated, the host device 50 includes a processing module 51, memory 52, peripheral interface 55, input interface 58 and output interface 56. The processing module 51 and memory 52 execute the corresponding instructions that are typically done by the host device. For example, in a cellular telephone device, the processing module 51 performs the corresponding communication functions in accordance with a particular cellular telephone standard. For data received from the wireless interface device 59 (e.g., inbound data), the peripheral interface 55 provides the data to the processing module 51 for further processing and/or routing to the output interface 56. The output interface 56 provides connectivity to an output display device such as a display, monitor, speakers, etc., such that the received data may be displayed. The peripheral interface 55 also provides data from the processing module 51 to the wireless interface device 59. The processing module 51 may receive the outbound data from an input device such as a keyboard, keypad, microphone, etc. via the input interface 58 or generate the data itself. For data received via the input interface 58, the processing module 51 may perform a corresponding host function on the data and/or route it to a wireless interface device 59 via the peripheral interface 55.

The wireless interface device 59 includes a host interface 100, a media-specific access control protocol (MAC) layer module 102, a physical layer module (PHY) 104, a digital-to-analog converter (DAC) 103, and an analog to digital converter (ADC) 105. As will be appreciated, the modules in the wireless interface device are implemented with a communications processor and an associated memory for storing and executing instructions that control the access to the physical transmission medium in the wireless network.

In addition to a first radio transceiver circuit and RF front end 61 (that may be integrated on a common substrate with the wireless interface 59), a second radio transceiver circuit and RF front end 66 is provided and coupled to the wireless interface device 59. For example, the first radio transceiver circuit and RF front end circuit 61 transforms baseband data into a 2.4 GHz signal in accordance with the 802.11g standard, while the second radio transceiver circuit and RF front end circuit 66 transforms baseband data into a 5 GHz signal in accordance with the 802.11a standard. With two separate radio transceiver circuits coupled to a wireless interface device 59, a single transceiver control signal 101 may be shared between the transceiver circuits 61, 66 by using a multiplexer or selection circuit 106 to route the transceiver control signal 101 to the appropriate transceiver circuit. For example, instead of having the wireless interface device 59 provide separate antenna switch control signals (and their attendant pin overhead for the device 59), the multiplexing of a shared antenna control signal 101 to the transceiver circuits 61, 66 reduces the pin count and overhead for the wireless interface device 59 without sacrificing performance.

Each external device (e.g., 65a,65g) includes its own wireless interface device for communicating with the wireless interface device of the host device. For example, the host device may be personal or laptop computer and the external devices 65 may be a headset, personal digital assistant, cellular telephone, printer, fax machine, joystick, keyboard, desktop telephone, or access point of a wireless local area network. In this example, external device 65a is an IEEE 802.11a wireless interface device and external device 65g is an IEEE 802.11g wireless interface device.

In operation, interference between communications with external devices 65a, 65g is avoided where the external devices operating in different frequency ranges are prioritized or sequenced. As a result, when transmission or reception is occurring with a first external device (e.g., 65a), the radio transceiver circuit 61 for the second external device 65g is disabled and the control signal 101 is routed to the radio transceiver circuit 66. Conversely, when transmission or reception is occurring with the second external device (e.g., 65g), the radio transceiver circuit 66 for the first external device 65g is disabled and the control signal 101 is routed to the radio transceiver circuit 61. The methods by which the MAC and/or PHY layer modules detect, adjust and/or route the control information 101 may be executed by the processing module(s) and other transceiver module(s) included in the wireless interface device 59, or may alternatively be executed by the processing functionality in the host device 50.

Figure 3:
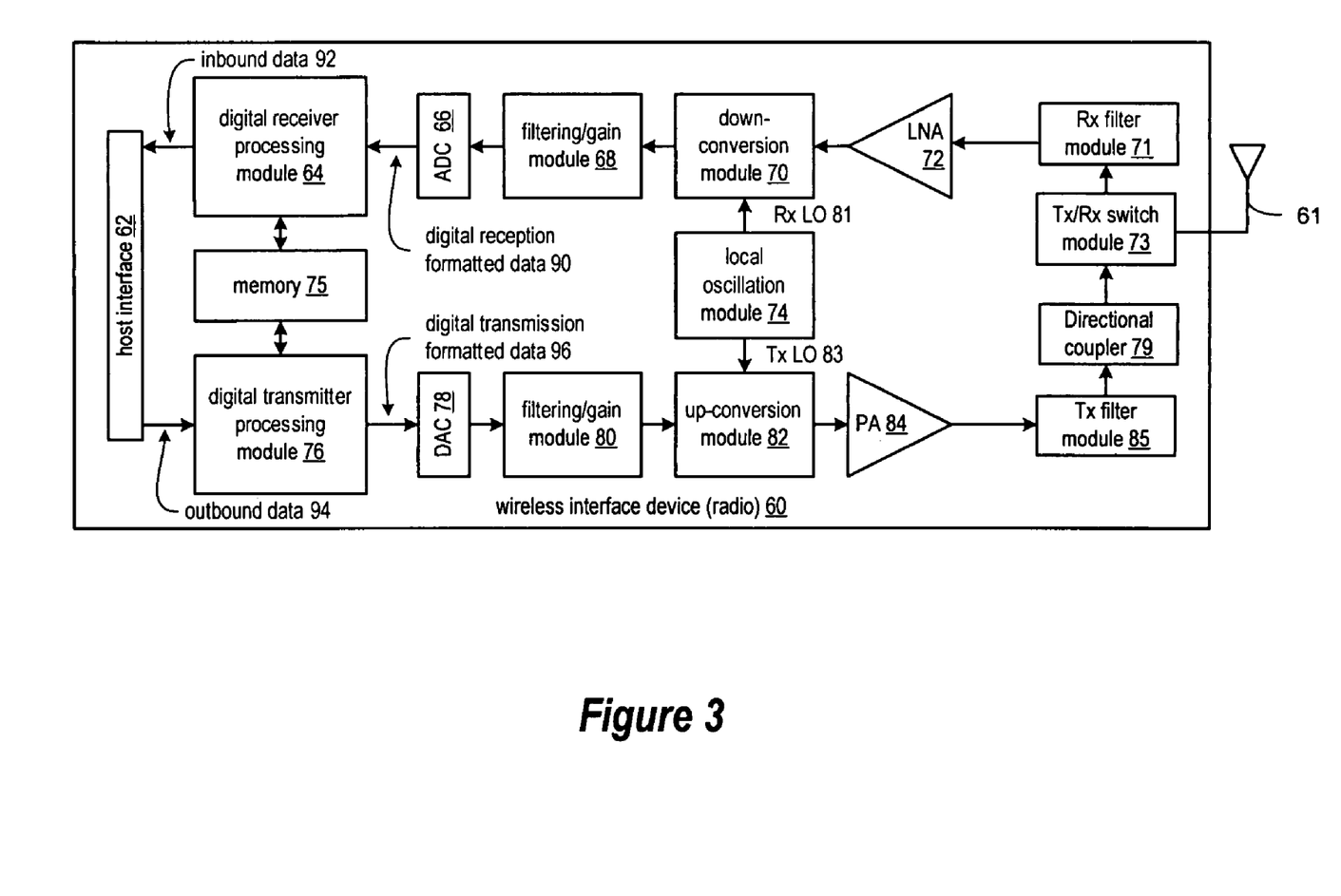
FIG. 3 is a schematic block diagram of a wireless interface device in accordance with the present invention.

FIG. 3 is a schematic block diagram of a wireless interface device (i.e., a radio) 60 which includes a host interface 62, digital receiver processing module 64, an analog-to-digital converter (ADC) 66, a filtering/gain module 68, an IF down-conversion stage 70, a receiver filter 71, a low noise amplifier 72, a transmitter/receiver switch 73, a local oscillation module 74, memory 75, a digital transmitter processing module 76, a digital-to-analog converter (DAC) 78, a filtering/gain module 80, an IF mixing up-conversion stage 82, a power amplifier 84, a transmitter filter module 85 and a diversity switch 77. The transmitter/receiver switch 73 is coupled to the diversity switch 77 through which two antennas 86, 89 are coupled to the wireless interface device. As will be appreciated, the antennas 86, 89 may be polarized antennas, directional antennas and/or may be physically separated to provide a minimal amount of interference. As illustrated, the transmitter/receiver switch 73 and diversity switch 77 selectively couple one of the antennas 86, 89 to the transmit/receive switch 73 in response to a diversity switching control signal 31 that is provided by the PHY module 104. In addition, a transmit/receive switching control signal 33 may be provided by the PHY module 104 to the transmit/receive switch module 73. In a selected embodiment, the wireless interface device 60 uses the transceiver and antenna section (86, 89, 77, 73, 71, 72, 70, 74, 82, 84, 85) to receive and transmit signals in accordance with a first signaling protocol (e.g., IEEE 802.11g) under control of the PHY module 104.

To provide dual band communications, the wireless interface device 60 may be coupled to a second transceiver and antenna section 40 to receive and transmit signals in accordance with a second signaling protocol (e.g., IEEE 802.11a). As illustrated, transceiver and antenna section 40 includes a radio transceiver circuit 41 and front end modulator 43 for receiving and transmitting 802.11a signals, in this example. The front end modulator section may be constructed of a transmitter/receiver switch 44 and a diversity switch 45 for selectively coupling one of the antennas 46, 47 to the transmit/receive switch 44 in response to a diversity switching control signal 31 that is provided by the PHY module 104. In addition, a transmit/receive switching control signal 39 may be provided by the PHY module 104 to the transmit/receive switch module 44.

The digital receiver processing module 64, the digital transmitter processing module 76 and the memory 75 may be included in the MAC module 102 and execute digital receiver functions and digital transmitter functions in accordance with a particular wireless communication standard. The digital receiver functions include, but are not limited to, digital intermediate frequency to baseband conversion, demodulation, constellation demapping, decoding and/or descrambling. The digital transmitter functions include, but are not limited to, scrambling, encoding, constellation mapping, modulation and/or digital baseband to IF conversion. The digital receiver and transmitter processing modules 64, 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64, 76 implements one or more of its functions via a state machine, analog circuitry, digital circuitry and/or logic circuitry, the memory storing the corresponding operational instructions may be embedded with the circuitry comprising the state machine, analog circuitry, digital circuitry and/or logic circuitry.

In operation, the wireless interface device 60 receives outbound data 94 from the host device via the host interface 62. The host interface 62 routes the outbound data 94 to the digital transmitter processing module 76, which processes the outbound data 94 to produce digital transmission formatted data 96 in accordance with a particular wireless communication standard, such as IEEE 802.11 (including all current and future subsections), Bluetooth, etc. The digital transmission formatted data 96 will be a digital base-band signal or a digital low IF signal, where the low IF typically will be in the frequency range of one hundred kilohertz to a few megahertz. Subsequent stages convert the digital transmission formatted data to an RF signal using a PHY module 104 and radio transmission circuitry, and may be implemented as follows. The digital-to-analog converter 78 converts the digital transmission formatted data 96 from the digital domain to the analog domain. The filtering/gain module 80 filters and/or adjusts the gain of the analog signal prior to providing it to the radio interface module 35. For transmission in accordance with a first signaling protocol (e.g., IEEEE 802.11g), the radio interface module 35 provides the filtered/adjusted analog signal to the up-conversion module 82. The IF mixing stage 82 directly converts the analog baseband or low IF signal into an RF signal based on a transmitter local oscillation clock 83 provided by local oscillation module 74. The power amplifier 84 amplifies the RF signal to produce outbound RF signal 98, which is filtered by the transmitter filter module 85. Antenna switching control signals 31, 33 provided to the transmit/receive switch module 73 and diversity switch module 77 route the outbound RF signal 98 for transmission to a targeted device such as a base station, an access point and/or another wireless communication device via a selected antenna 86, 89.

In accordance with a selected embodiment whereby a signal is to be transmitted in accordance with a second signaling protocol (e.g., IEEE 802.11a), the radio interface module 35 provides the filtered/adjusted analog signal 29 to the second transceiver and antenna section 40. In addition to providing the filtered/adjusted analog signal 29 to the radio transceiver 41, antenna switching control signals 37, 39 are provided to the transmit/receive switch module 44 and diversity switch module 45, which route the outbound RF signal from transceiver 41 for transmission to a targeted device such as a base station, an access point and/or another wireless communication device via a selected antenna 46, 47.

In accordance with a selected embodiment whereby a signal is to be received in accordance with a first signaling protocol (e.g., IEEE 802.11g), the wireless interface device 60 receives an inbound RF signal 88 from an antenna 86, 89 via antenna switch module(s) 73, 77, which was transmitted by a base station, an access point, or another wireless communication device. The inbound RF signal is converted into digital reception formatted data, either directly or through an intermediate frequency conversion process which may be implemented as follows. The diversity switch module 77 and transmit/receive switch module 73 provide the inbound RF signal 88 to the receiver filter module 71, where the receiver filter 71 bandpass filters the inbound RF signal 88. The receiver filter 71 provides the filtered RF signal to low noise amplifier 72, which amplifies the signal 88 to produce an amplified inbound RF signal. The low noise amplifier 72 provides the amplified inbound RF signal to the IF mixing module 70, which directly converts the amplified inbound RF signal into an inbound low IF signal or baseband signal based on a receiver local oscillation clock 81 provided by local oscillation module 74. The down conversion module 70 provides the inbound low IF signal or baseband signal to the filtering/gain module 68 via the radio interface 35. The filtering/gain module 68 filters and/or gains the inbound low IF signal or the inbound baseband signal to produce a filtered inbound signal. The analog-to-digital converter 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by wireless interface device. The host interface 62 provides the recaptured inbound data 92 to the host device (e.g., 50) via the peripheral interface (e.g., 55).

In accordance with a selected embodiment whereby a signal is to be received in accordance with a second signaling protocol (e.g., IEEE 802.11a), the radio interface module 35 receives the inbound low IF signal or baseband signal 27 from the second transceiver and antenna section 40. In addition to receiving the inbound low IF signal or baseband signal 27 from the radio transceiver 41, the radio interface 35 provides antenna switching control signals 37, 39 to the transmit/receive switch module 44 and diversity switch module 45, which route the inbound RF signal from a targeted device via selected antenna 46, 47.

By distributing a single antenna switching control signal 48 from the radio interface 35 to the antenna sections of the first and second radio transceiver sections using a multiplexer or selection circuit 49, the overall pin count requirements for the wireless interface device 60 may be reduced. For example, instead of having one group of control pins on the wireless interface device 60 for controlling the diversity switch 77 in the first transceiver circuit 61, and another group of control pins on the wireless interface device 60 for controlling the diversity switch 45 in the second transceiver circuit 40, the present invention uses a single group of control pins on the wireless interface device 60 for controlling both diversity switches 77, 45 by multiplexing the control signal 48 issued by the PHY module 104 through a selection circuit 49. The shared antenna control protocol does not affect the performance of a second transceiver circuit (e.g., 802.11a transceiver 40) when the first transceiver circuit (e.g., 802.11g transceiver 61) is active where the second transceiver circuit is disabled during transmit/receive operations of the first transceiver circuit. In a selected embodiment, the PHY module 104 provides the shared antenna control signal 48 which is distributed via selection circuit 49 under control of the software operations that configure the system for transmit/receive operations under either a first protocol (e.g., the 802.11g protocol, whereby the second transceiver and antenna section 40 is disabled) or a second protocol (e.g., the 802.11a protocol, whereby the first transceiver and antenna section 61 is disabled).

As will be appreciated, the wireless communication device of FIG. 2 described herein may be implemented using one or more integrated circuits. For example, the host device 50 may be implemented on one integrated circuit, the digital receiver processing module 64, the digital transmitter processing module 76 and memory 75 may be implemented on a second integrated circuit, the remaining components of the wireless interface device 60 may be implemented on a third integrated circuit and the second transceiver and antenna section 40 may be implemented in a fourth integrated circuit. As an alternate example, the wireless interface device 60 may be implemented on a first integrated circuit and the second transceiver and antenna section 40 may be implemented in a second integrated circuit. As yet another example, the wireless interface device 60 and the second transceiver and antenna section 40 may be implemented in a single integrated circuit. In addition, the processing module 51 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 51 and the digital receiver and transmitter processing module 64 and 76.

In a selected embodiment, the present invention shows, for the first time, a fully integrated, single chip 802.11b/g solution with connectivity in the 2.4 GHz band, and with built-in support for 802.11a connectivity in the 5 GHz band, all implemented in CMOS (Complementary Metal Oxide Semiconductor), as part of a single chip or multi-chip transceiver radio using shared antenna control pins. The present invention enables wireless communication devices (such as a WLAN device) to communicate with other wireless devices by controlling multiple transceiver circuits (and their associated antenna switching circuitry) with a shared control signal when priority as between the competing WLAN devices has been allocated.

The wireless interface device 60 illustrated in FIG. 3 comprises a directional coupler 79 connected between the transmitter filter module 85 and the transmitter switch module 73. The directional coupler 79 is operable to provide a measurement of transmitted RF power to allow measurement of signal quality and for regulatory compliance purposes.

Figure 4:
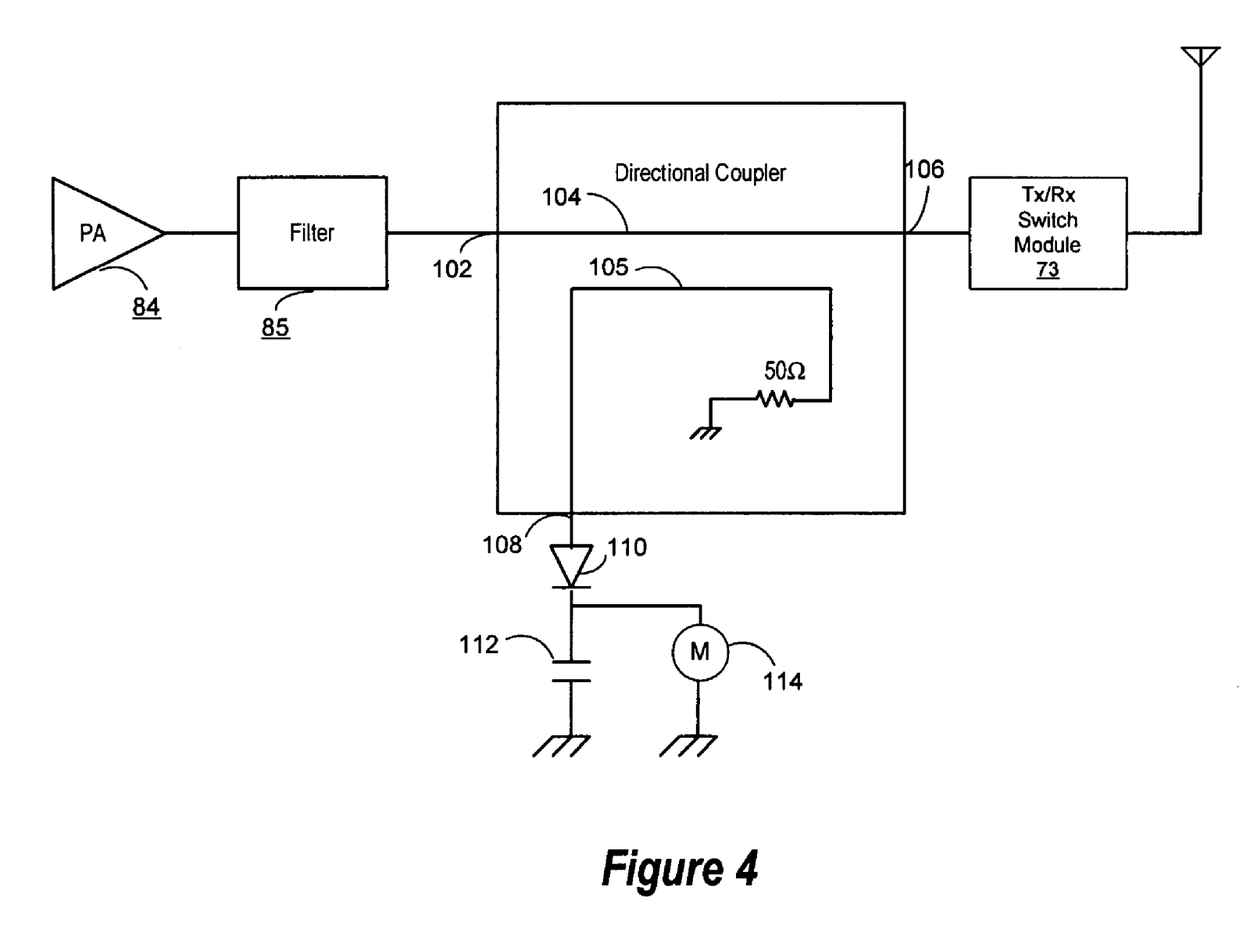
FIG. 4 is an illustration of a prior art directional coupler.

FIG. 4 is an illustration of prior art directional coupler 100 for measuring the forward signal power generated by the power amplifier 84 and passed through the transmitter filter module 85 to the input port 102. The input port 102 is connected to the main transmission line 104 which is further connected to the output port 106. The RF signal transmitted through the main transmission line 104 is passed through the Tx/Rx switch module 73 which is connected to the antenna 61. The auxiliary transmission line 105 is terminated on one end with a 50 ohm terminator. The other end of the auxiliary transmission line is connected to the forward signal monitoring port 108. The forward signal monitoring port 108 is connected to the detector diode 110 and the smoothing capacitor 112. A forward power meter 114 is connected across the smoothing capacitor 112 to provide a measurement of forward transmitted power.

As will be understood by those of skill in the art, the parallel portions of the main transmission line 104 and the auxiliary transmission line 105 provide a "coupling region" facilitating the electromagnetic coupling of signals from main line 104 into the auxiliary line 105. More specifically, in response to a forward RF input signal carried in the main transmission line 104, a portion of this forward power will be induced in auxiliary line 105 and will be passed through an envelope detector, which in the embodiment illustrated in FIG. 4 comprises the detector diode 110 and the smoothing capacitor 112. The forward power can be measured by the meter 114 or another appropriate sensing apparatus. As will be understood by those of skill in the art, the signal detected by the meter 114 is proportional to the forward transmitted power and can be used to obtain an accurate measurement of the transmitted power.

One of the problems associated with prior art directional couplers is signal degradation associated with distortion created by the circuit components used to measure the transmitted power. For example, the diode detector 110 is a nonlinear device that can create distortions at frequencies corresponding to harmonics of the fundamental carrier frequency of the transmitted signal. As will be understood by those of skill in the art, combinations of the harmonic frequencies can cause intermodulation interference, especially third and fifth intermodulation products at the third and fifth harmonics, that can degrade the transmitted signal. In a typical −15 dB directional coupler, the interference signals will be coupled at −30 dB. In many of the current wireless systems, the power of the transmitted signal is at a very low level and the transmitted signal can be essentially destroyed by the interference created by the detector circuitry of the directional coupler.

Figure 5:
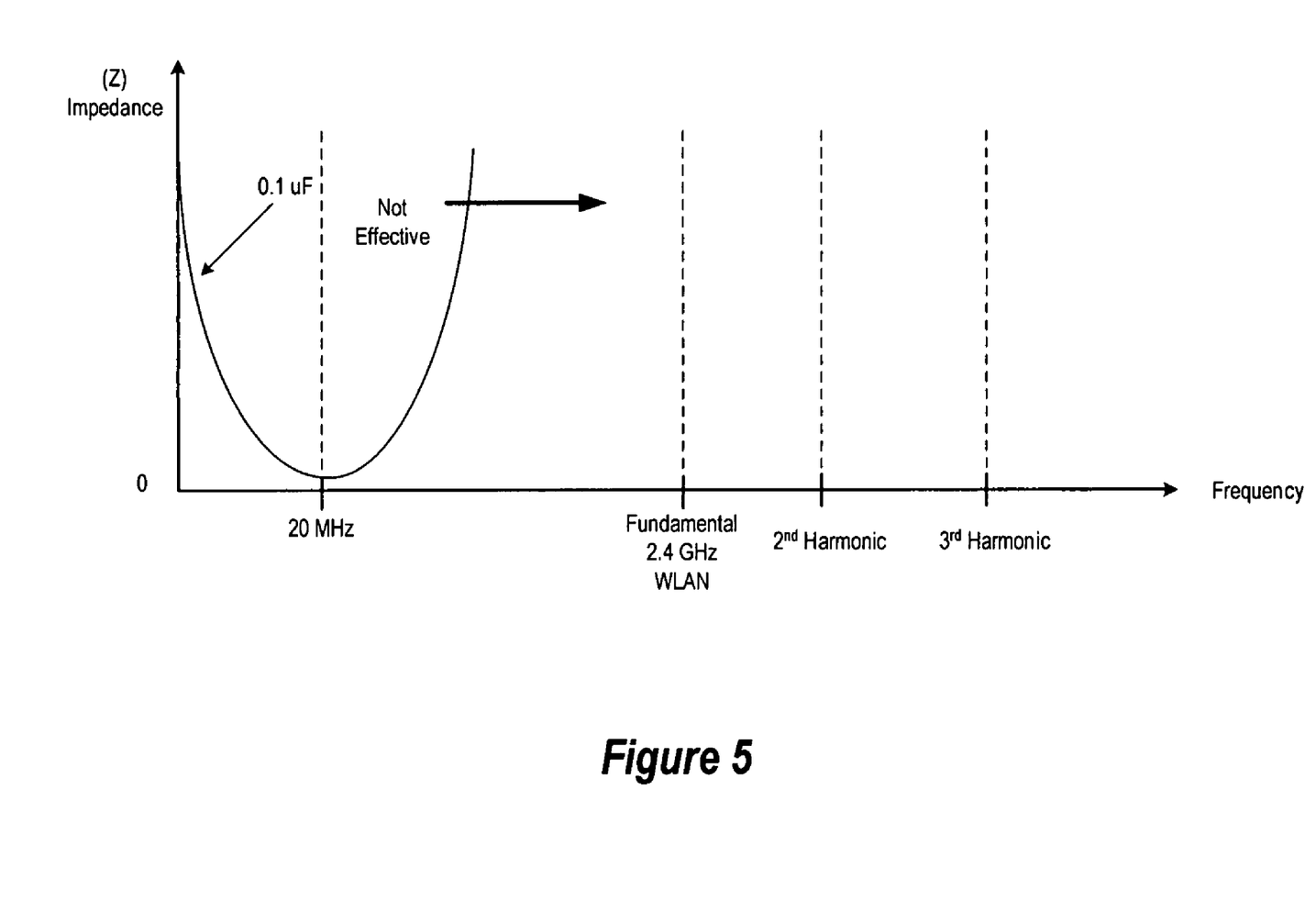
FIG. 5 is an illustration of the impedance versus frequency characteristics of the directional coupler illustrated in FIG. 4.

FIG. 5 is an illustration of the impedance-versus-frequency characteristics of a prior art directional coupler having a single smoothing capacitor. As an example, the smoothing capacitor 112 used in a typical directional coupler 100 might have a value of 0.1 μF. This capacitance value will result in an impedance minimum at approximately 20 MHz, as illustrated in FIG. 5. A capacitor with a value of 0.1 μF, however, will be ineffective for eliminating in-band distortions at higher frequencies, such as the 2.4 GHz band of the wireless devices discussed hereinabove.

Figure 6:
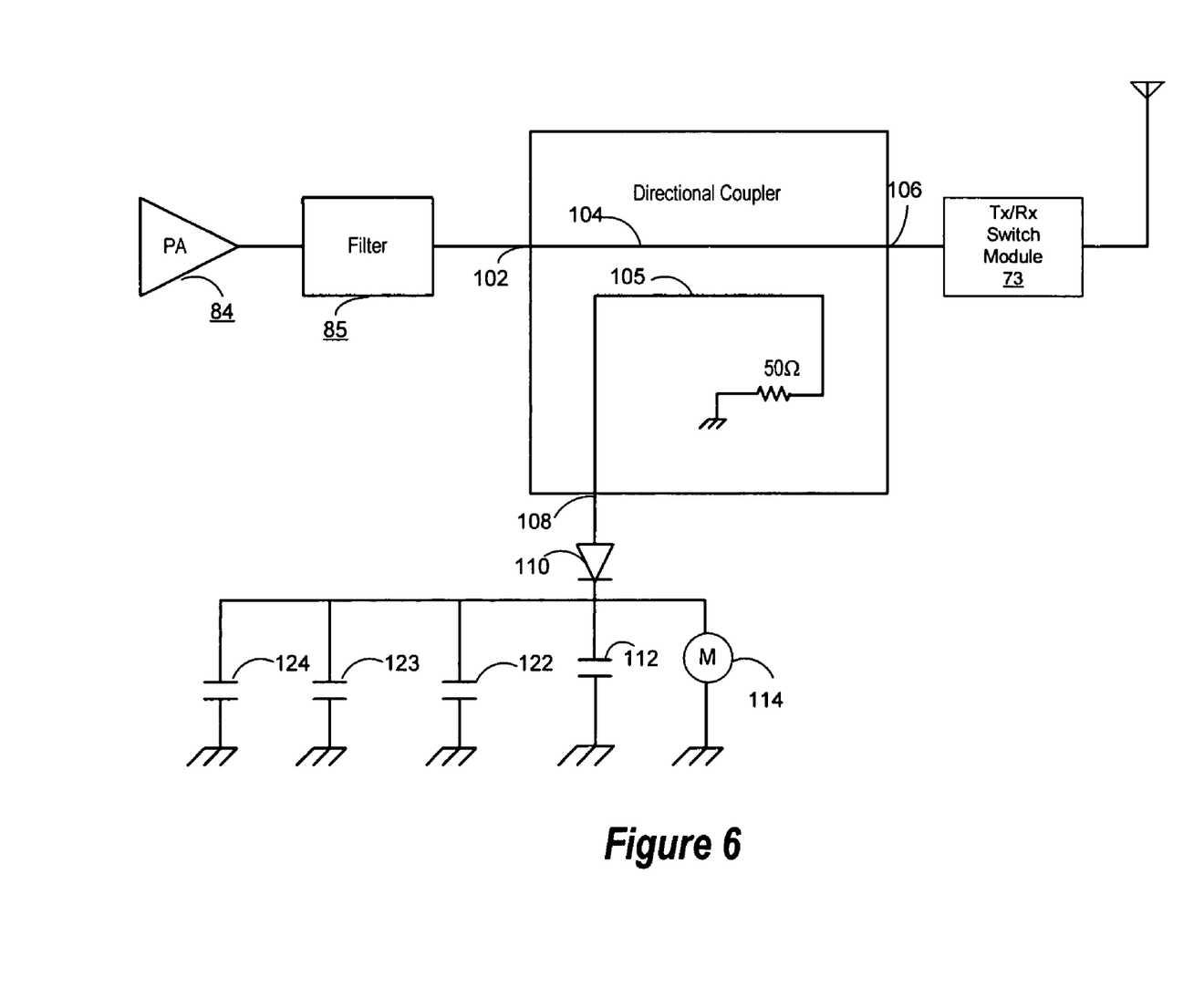
FIG. 6 is an illustration of the directional coupler of the present invention.

FIG. 6 is an illustration of the improved directional coupler 120 of the present invention. Many of the functional components of the directional coupler 120 are substantially the same as those described above and, therefore, their function will not be repeated. The directional coupler 120, however, has three additional capacitors 122, 123 and 124 that are connected to the detector diode 110 as illustrated in FIG. 6. These three capacitors have values that are selected to minimize interference related to the distortion generated by the detector diode 110. For example, in a system in the 2.4 GHz band (e.g., 2.412 GHz), the capacitor 122 can be selected to have a value of 5.6 pF to minimize interference in the 2.4 GHz band. The value of capacitor 123 can be selected to have a value 2.2 pF to minimize distortion at the at the second harmonic (4.824 GHz) and the capacitor 124 can be selected to have a value of 1.5 pF to minimize distortion at third harmonic frequency (7.326 GHz).

Figure 7:
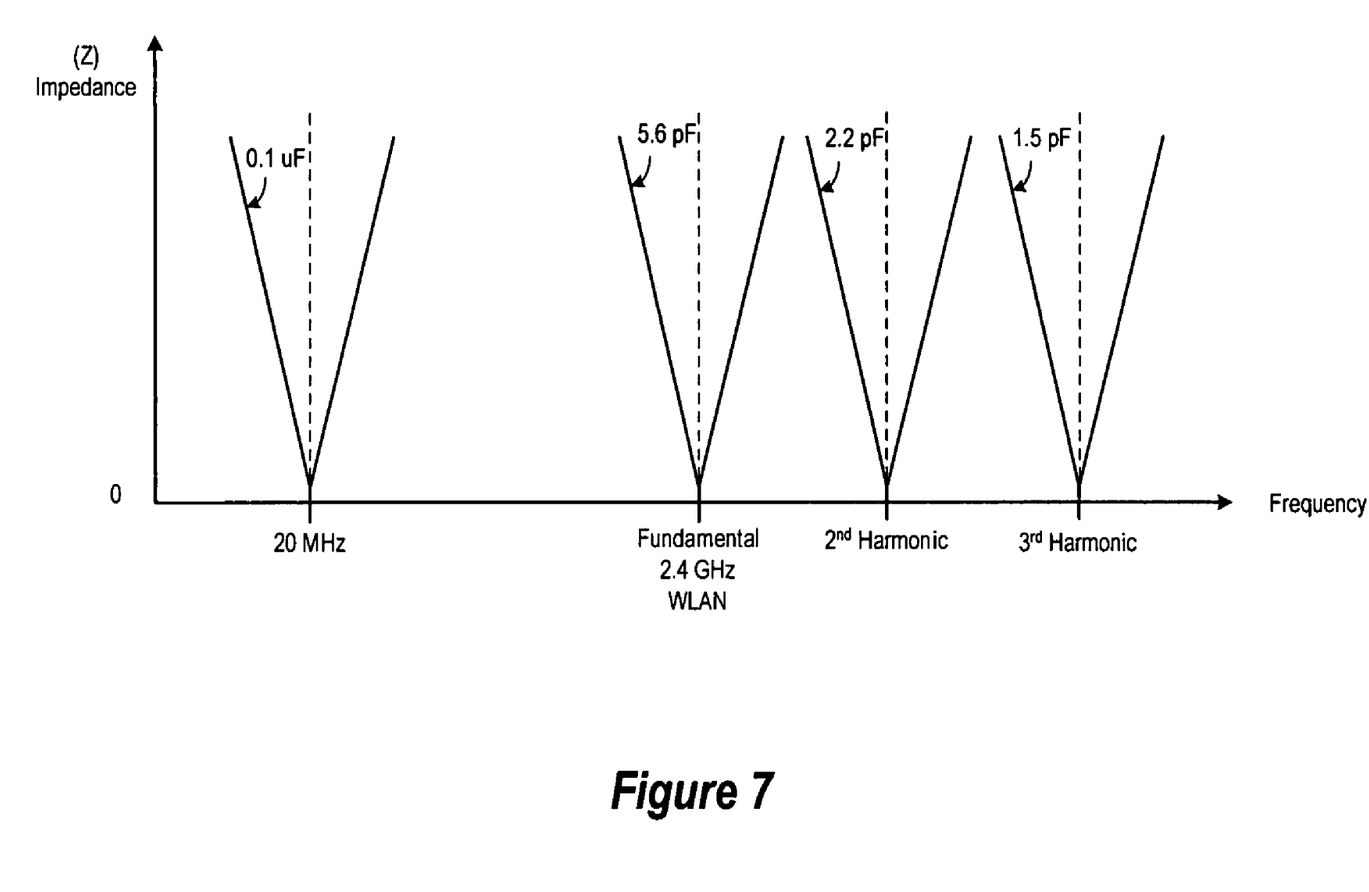
FIG. 7 is an illustration of the impedance versus frequency characteristics of the directional coupler of the present invention illustrated in FIG. 6.

FIG. 7 is a graphical illustration of the impedance-versus-frequency characteristics of the directional coupler 120 illustrated in FIG. 6. As will be understood by those of skill in the art, the capacitance value of 5.6 pF for capacitor 122 will minimize the impedance at the fundamental frequency (e.g., 2.412 GHz). Similarly, the capacitance value of 2.2 pF will minimize the impedance at the second harmonic (e.g., 4.824 GHz) and the 1.5 pF will minimize the impedance at the third harmonic (e.g., 7.236 GHz). It will be understood by those of skill in the art that other capacitor values can be used to minimize the interference at other frequencies. Since the capacitance values of the capacitors 122, 123 and 124 are substantially lower than the value of the smoothing capacitor 112, the smoothing function of the capacitor 112 is not adversely affected. The performance of the directional coupler in terms of minimizing degradation of the transmitted signal is significantly improved, however, with the addition of the capacitors 122, 123 and 124.

As will be understood by those of skill in the art, the teachings of the present invention can be applied to create similar benefits for directional couplers that are used to measure the transmitted power of signals at other fundamental carrier frequencies and to minimize the adverse effects intermodulation interference at the various harmonics of those fundamental carrier frequencies. While the system and method of the present invention has been described in connection with the preferred embodiment, it is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

The invention claimed is:

1. A communication system comprising:
 a radio module operable to generate an RE signal at a predetermined frequency; and
 a directional coupler operably coupled to said radio module to measure the power of said RF signal, said directional coupler further comprising:
  an envelope detector comprising a detector diode and a capacitor; and
  distortion minimization circuitry operable to minimize distortion generated by said envelope detector at frequencies corresponding to said predetermined frequency and harmonics thereof, said distortion minimization circuitry comprising a first capacitor coupled to said diode, said first capacitor having a capacitance value for minimizing distortion in the frequency band corresponding to the fundamental frequency of said RE signal, and a second capacitor coupled to said diode, said second capacitor having a capacitance value for minimizing distortion in the frequency band corresponding to the second harmonic of said fundamental frequency of said RF signal.

2. The communication system of claim 1, wherein said distortion minimization circuitry further comprises a third capacitor coupled to said diode, said third capacitor having a capacitance value for minimizing distortion in the frequency band corresponding to the third harmonic of said fundamental frequency of said RF signal.

3. The communication system of claim 2, wherein said first RF signal has a fundamental frequency in the 2.4 GHz band.

4. A method of measuring the transmitted power of an RF signal, comprising:
 generating an RF signal at a predetermined frequency;
 measuring the transmitted power of said RF signal using a directional coupler having an envelope detector comprising a detector diode and a capacitor; and
 minimizing distortion generated by said envelope detector at frequencies corresponding to said predetermined frequency and harmonics thereof by coupling first and second capacitors to said diode, said first capacitor having a capacitance value for minimizing distortion in the frequency band corresponding to the fundamental frequency of said RF signal, said second capacitor having a capacitance value for minimizing distortion in the frequency band corresponding to the second harmonic of said fundamental frequency of said RF signal.

5. The method of claim 4, wherein said distortion is minimized by coupling a third capacitor to said diode, said third capacitor having a capacitance value for minimizing distortion in the frequency band corresponding to the third harmonic of said fundamental frequency of said RF signal.

6. The method of claim 5, wherein said first RF signal has a fundamental frequency in the 2.4 GHz band.

7. An integrated circuit for enabling data communication between a host device and at least one wirelessly enabled external device, comprising:
 a host interface;
 a radio module operably coupled to said host interface, wherein said radio module is operable to generate an RF signal at a predetermined frequency; and
 a directional coupler operably coupled to said radio module to measure the power of said RF signal, said directional coupler further comprising:
  an envelope detector comprising a detector diode and a capacitor; and
  distortion minimization circuitry operable to minimize distortion generated by said envelope detector at frequencies corresponding to said predetermined frequency and harmonics thereof, said distortion minimization circuitry comprising a first capacitor coupled to said diode, said first capacitor having a capacitance value for minimizing distortion in the frequency band corresponding to the fundamental frequency of said RF signal, and a second capacitor coupled to said diode, said second capacitor having a capacitance value for minimizing distortion in the frequency band corresponding to the second harmonic of said fundamental frequency of said RF signal.

8. The communication system of claim 7, wherein said distortion minimization circuitry further comprises a third capacitor coupled to said diode, said third capacitor having a capacitance value for minimizing distortion in the frequency band corresponding to the third harmonic of said fundamental frequency of said RF signal.

9. The communication system of claim 8, wherein said first RF signal has a fundamental frequency in the 2.4 GHz band.

* * * * *